United States Patent [19]

Wood et al.

[11] 4,404,860
[45] Sep. 20, 1983

[54] FLOW RATE SENSOR

[75] Inventors: Hugh C. Wood; Simon W. J. H. Okkerse, both of Saskatoon, Canada

[73] Assignee: SED Systems Inc., Saskatoon, Canada

[21] Appl. No.: 228,525

[22] Filed: Jan. 26, 1981

[30] Foreign Application Priority Data

Feb. 1, 1980 [CA] Canada .................................. 344891

[51] Int. Cl.$^3$ .............................................. G01F 1/75
[52] U.S. Cl. ............................... 73/861.78; 73/861.87
[58] Field of Search ............ 73/861.77, 861.78, 861.87; 324/166, 173, 236; 340/870.31

[56] References Cited

U.S. PATENT DOCUMENTS

| | | | |
|---|---|---|---|
| 2,288,838 | 7/1942 | Pike et al. | 340/870.31 |
| 3,053,087 | 9/1962 | Waugh | 73/861.78 |
| 3,177,711 | 4/1965 | Ham et al. | 73/861.78 |
| 3,455,162 | 7/1969 | Michener et al. | 73/861.78 |
| 3,771,363 | 11/1973 | Stapler | 73/861.92 |
| 4,101,874 | 7/1978 | Denison et al. | 73/861.79 |

OTHER PUBLICATIONS

Walewsni et al., "Position Detection Device Using Amplitude Modulation", in I.B.M. Tech. Disc. Bulletin, vol. 14, #7, 12/71, pp. 2119-2120.

Primary Examiner—Herbert Goldstein
Attorney, Agent, or Firm—Alan H. Levine

[57] ABSTRACT

A flowmeter for measuring the flow rate of fluids, having a range from a very low to a very high value. An impeller is located in a pipe for rotation with the flow of fluid. Metallic vanes of the impeller pass through the field of an inductor which is in a series circuit with a capacitor. An oscillator applies a signal at the series resonant frequency of the capacitor and inductor. The envelope of the resulting high voltage signal across the inductor is detected, filtered, and the resulting output pulses in excess of a minimum threshold can be applied to a counting apparatus for establishing the flow rate with high sensitivity. Since the spacing between the impeller and pickup is not critical, a meter is provided which does not clog with magnetic or non magnetic particles suspended in the fluid to be measured. The meter pickup can also be used to sense the rotation rate of wheels or the like having metallic discontinuities, whereby the speed of a vehicle, the rotation rate of a shaft, etc. can be determined.

12 Claims, 4 Drawing Figures

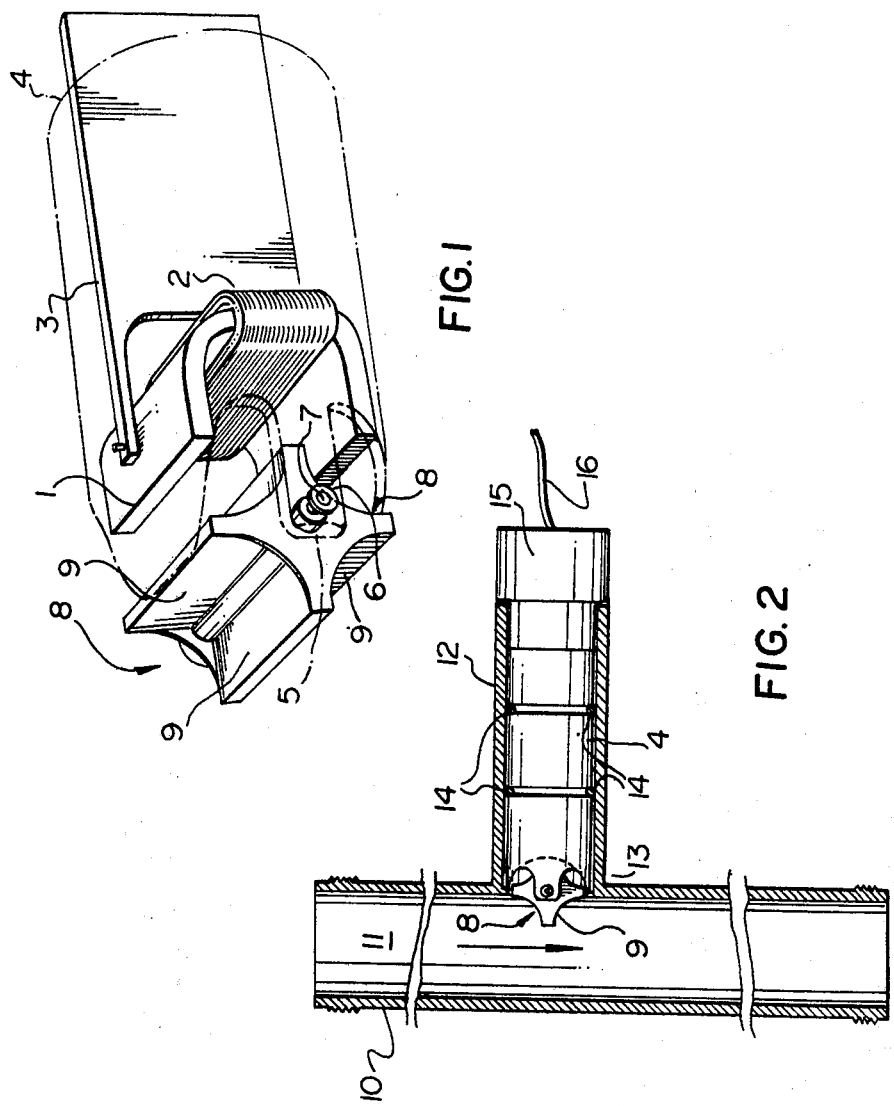

FLOW RATE SENSOR

FIELD OF THE INVENTION

This invention relates to a flowmeter for detecting the flow rate of fluid materials, and which can also be used as a sensor for providing an indication of the rate of rotation or movement of a metallic element which carries one or more plane discontinuities.

BACKGROUND OF THE INVENTION

When the flow rate of fluids is to be determined, it is of course desirable to determine the rate of flow in a reliable and reproducible manner. It has been particularly difficult to provide a single flow meter which can universally measure fluid flow where the flow can vary from a very low rate (e.g. in a pipe carrying a low viscosity fluid, or at low pressure) to a high rate, (e.g. in a pipe carrying a high viscosity fluid at high pressure). These types of widely varying conditions are often encountered by farmers applying various chemicals to their fields. As an example, farmers utilize a tank of liquid chemical or the like which feeds a plurality of tubes leading to field spray nozzles. The rate of flow of the chemical through a main feeder tube or through each of the sprayer tubes must be determined to enable the farmer to accurately determine the amount of chemical being applied per acre.

The fluid to be applied, and thus which must be metered, is often far from an ideal homogeneous liquid. The fluid may have microscopic suspended chemical particles, may be of high, low, or varying viscosity, may have metallic or other particles such as seeds of undetermined size suspended therein, may be highly corrosive, etc.

It is of course preferable that the farmer should not have to change fluid meters to accommodate the different conditions as noted above, and yet the meter should be easy to remove for servicing. The metering device should also reliably provide an indication of the flow rate in the presence of a hostile environment.

BRIEF DESCRIPTION OF THE PRIOR ART

One form of flowmeter which had been designed to operate as a universal flowmeter utilizes a magnetic impeller which is partly inserted into a plastic pipe which carries the fluid to be metered. A magnetic reluctance pickup senses when the impeller rotates under influence of the fluid movement, and provides output pulses in response thereto. For maximum electrical sensitivity, the impeller must be as close to the pickup as possible.

However it has been found that magnetic material often suspended in the fluid to be metered is attracted to the magnetic poles of the pickup, clogging the chamber in which the impeller rotates, and eventually stopping rotation of the impeller. Even if the impeller is not completely clogged, the calibration of the device is upset since the rate of rotation is slowed or made erratic. Tolerances are very critical, and clearly the reliability of measurement is substantially affected.

Due to the tight tolerances required, there is very little room for particulate matter to flow around the impeller, and consequently a build-up of solid matter has usually been found to result when suspended powders are used in the fluid.

Additionally, the impeller is magnetically attracted to the pickup. The amount of fluid flow required to initiate rotation of the impeller is relatively high, since the magnetic bond between the pickup and impeller must be broken for a minimum rate to be measured. There are clearly conflicting requirements between increased electrical sensitivity, with the requirement of very close impeller to pickup spacing (tending to increase the force required to begin rotation of the impeller) and increased sensitivity to low flow rate, which requires minimum magnetic attraction between the impeller and pickup, in order to allow rotation with minimum fluid flow, and which results in low electrical sensitivity.

SUMMARY OF THE INVENTION

The present invention, on the other hand, does not utilize magnetic attraction between the flow indicator (e.g., impeller) and pickup. Consequently, there is no magnetic attraction bond to be broken before flow can be measured. Clearly flow rates substantially lower than the flow rates measurable by the reluctance pickup can be achieved with the present invention.

Further, since magnetic components are not necessary in the present invention, metallic particles suspended in the fluid to be metered merely pass the flowmeter without attraction and without consequent buildup.

Tolerances between the impeller and pickup are not critical, and indeed, the distance between the sensed portions of the impeller and the pickup in the present invention can be typically as wide as 1 centimeter. Clearly particulate matter such as seeds, powders, etc. are easily accommodated.

The flow meter of the present invention provides a minimum pressure drop, and has been measured at a fraction of a pound per square inch at 50 gallons per minute, in a 100 pound per square inch system. The lower limit of measurement of flow is based on the extremely low rotation starting friction in a low-friction bearing. Further, the present invention has been found to withstand up to 1500 pounds per square inch pressure of the fluid to be metered.

The flow meter pickup according to the invention is comprised of an inductor and a capacitor connected in a series circuit, an oscillator connected to the series circuit adapted to apply a signal to the circuit at a frequency at which the inductor and capacitor are in series resonance. A further circuit is connected to the inductor and capacitor circuit for detecting the envelope of the signal, and a further circuit is included for converting pulsations in the envelope to an output signal. Variations in the envelope forming the pulsations are caused by movement of a metallic element in the field of the inductor. Due to the high voltage observed across the inductor or capacitor, the spacing of the metallic element from the inductor field can be relatively large.

It is preferred that the metallic element moved in the field of the inductor should not be magnetic. Indeed, the metallic element can be merely a discontinuity in the plane surface of a moving or rotating structure, a spoke, a series of spaced metal fingers, notches, bumps, etc. on a rotating or moving object past the pickup, etc. A metallic bump on the side of a wheel can be detected, whereby the rotation rate of the wheel can be measured. For measuring the flow rate of a fluid, an impeller is used and mounted in front of the inductor. Upon rotation of the impeller under the influence of the flow of fluid, the rotation rate of the impeller and thus the flow rate of the fluid can be determined.

It is also preferred that the inductor should be comprised of a coil of wire wound on a U-shaped ferrite core, the arms of the core being physically directed toward the location of the metallic element, and particularly the broadest surface thereof.

INTRODUCTION TO THE DRAWINGS

A better understanding of the invention will be obtained by reference to the detailed description below, and to the following drawings, in which:

FIG. 1 is a partly x-ray view of the mechanical portion of the invention;

FIG. 2 is a side elevation in cut-away view of the invention in place in a pipe for carrying fluid.

DESCRIPTION OF A PREFERRED EMBODIMENT

Figure 3:
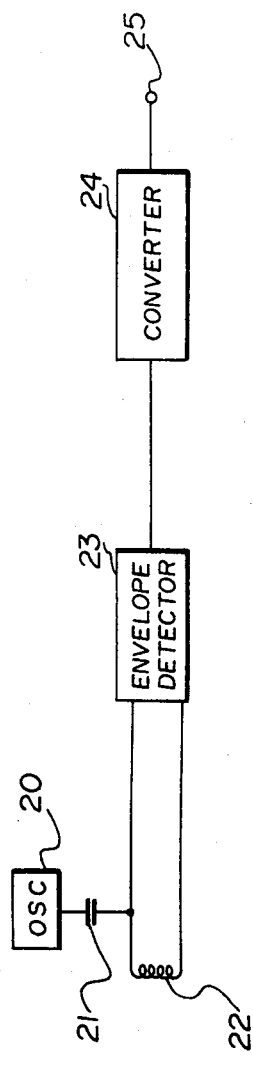
FIG. 3 is a general block schematic of the electrical pickup of the invention.

Turning first to FIG. 1, a perspective view, partly in phantom, of the mechanical portion of the invention is shown. A U-shaped ferrite core 1 has an inductor 2 wound around it. It has been found that for good high frequency response, the inductance of the inductor should be approximately 12 millihenry, although this value is not mandatory. The core is mounted on a printed circuit board 3 on which the remaining circuitry to be described below is mounted. The printed circuit board preferably slides into the open end of a cylinder 4 closed at the other end, the printed circuit board being held in grooves which lie along the inside of the cylinder (not shown). The ends of the arms of the ferrite core should preferably butt against the closed end of the cylinder. The cylinder should be made of an inert plastic material such as Delrin (trade mark) or the like.

A pair of arms 5 of the cylinder (only one being shown) extend forward of the end thereof, and contains opposite holes 6 for accommodating axle 7 of an impeller. The impeller can take a variety of forms. Preferably the impeller is comprised of four vanes 9 (only 3 of which are visible) attached to axle 7, or preferably to a bushing around the axle. The impeller structure can be made of an inert plastic material, but if this construction is used it should have a plane metallic element imbedded or formed in each vane. Each element should extend across the impeller to provide a board surface area to the ferrite core. Alternatively the entire impeller can be formed of metal, such as stainless steel.

In order to reduce friction to its minimum, and obtain self-lubricating qualities, it is preferred that the axle should be made of a ceramic material, and the bushings should be made of compressed carbon with a binder. It has been found that the carbon is self-lubricating on the ceramic, and provides an extremely low friction factor, allowing the impeller to rotate easily.

The distance between the arms of the ferrite core can be about 1½ centimeters, and the distance between an arm and the plane surface of an adjacent vane can be about 1 centimeter. The ferrite core can be one-half of a toroid. However the invention is not restricted to use of this form of core; an E-shaped or pot core with the coil wound around the center leg of the core could also be used.

Turning now to FIG. 2, a T-shaped section of pipe 10 is shown, having a flow-through portion 11 and a tapped portion 12. The cylinder 4 which houses the ferrite core, inductor and remaining circuitry is inserted into the tapped portion, sufficiently far to extend one of the vanes 9 of the impeller into the flow-through portion 11. Preferably the tapped portion 12 is reamed out to a position close to the flow-through portion 11 in order to facilitate entry of cylinder 4 to a stop 13 which impedes further intrusion of the impeller into the flow-through portion. Clearly the diameter of cylinder 4 should be close fitting to the inside of the pipe of tapped portion 12. A pair of O-rings 14 preferably are inserted into a pair of annular grooves in cylinder 4, to stop the egress of fluid. The cylinder 4 containing the electronic circuitry is preferably encapsulated with a sealing epoxy compound, shown as sealing cap 15.

Referring now to FIGS. 1 and 2 together, fluid flows through pipe 11, e.g., in the direction of the arrow. The impeller is caused to rotate as a result, bringing the plane surfaces of the vanes 9 repetitively opposite the ends of ferrite core 1. Circuitry to be described below retained within cylinder 4 responsively causes output pulses to be applied to cable 16 with each quarter rotation of the impeller.

It may be seen that since the impeller can begin moving when only its miniscule bearing friction has been overcome by movement of the fluid, a very low rate of fluid flow can be detected. However the structure of the invention is such that it can also detect fluid flow rates which cause rotation of the impeller at up to 24,000 revolutions per minute.

Further, the impeller structure is virtually fluid pressure immune, since the impeller is entirely surrounded by the fluid to be metered, and egress of the fluid is substantially stopped by O-rings 14.

FIG. 3 shows the pickup circuit portion of the invention in its most basic form. An oscillator 20 has its output connected in series with a capacitor 21, which itself is connected in series with an inductor 22. The inductor is the same inductor which is wound around the ferrite core described earlier.

An envelope detector 23 is connected to the junction of capacitor 21 and inductor 22, and the output of envelope detector 23 is connected to a converting circuit 24 to be described in more detail below. The output of the converting circuit 24 is connected to output terminal 25.

In operation, oscillator 20 applies a signal to the capacitor 21 and inductor 22 at a frequency at which the circuit is in series resonance. Accordingly very high voltage appears across inductor 22. This high voltage is applied to envelope detector 23, which detects pulsations in the envelope caused by movement of the impeller, and applies them to converter 24. Converter 24 converts the pulsations to square waves and applies them to output terminal 25.

It should be noted that the use of a series resonant circuit provides the above-described high output voltage. Accordingly the sensitivity of the circuit is extremely high, and as a result the circuit can tolerate movement of the impeller at a significant distance from the inductor 22, while reliably detecting pulsations in the envelope of the signal from oscillator 20.

There results a considerable improvement over prior art flowmeters. A non-magnetic impeller can be used, reducing the high level of starting magnetic friction encountered in the described flowmeter of the prior art, thus extending the low flow rate sensing ability of this flowmeter.

Further, since the high voltage output of inductor 22 affords increased sensitivity, the edge of the impeller can be spaced a minimum of 1/16 inch or greater from its housing boundary, allowing suspended particles such as seed, dirt granules, metal particles, etc. to flow around the impeller without build up. The plane surface of the impeller, which is the surface mainly detected, can be spaced 1 cm. or more from the housing boundary.

Figure 4:
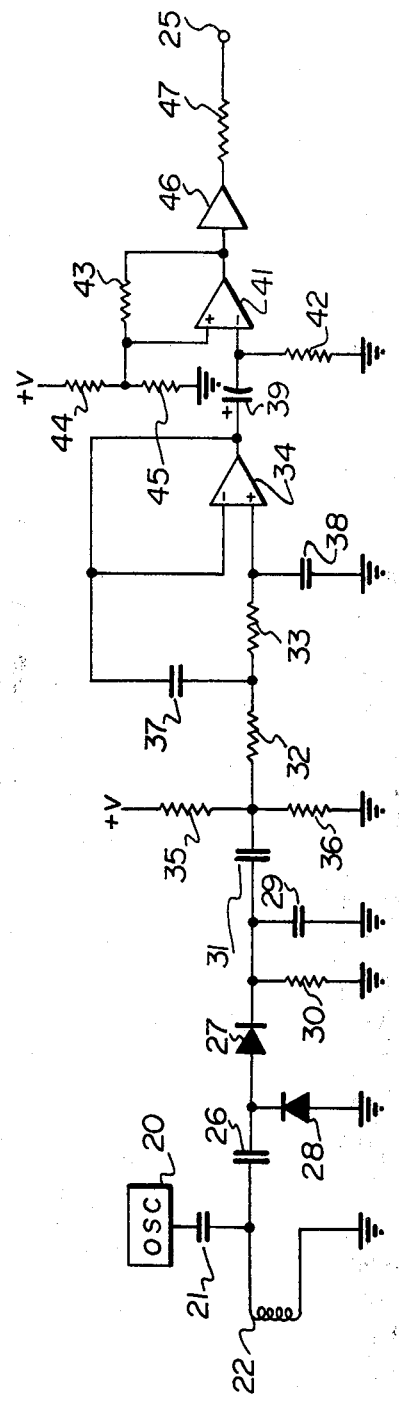
FIG. 4 is a detailed schematic of the electrical pickup of the invention.

Turning now to FIG. 4, a detailed schematic of the invention is shown. Oscillator 20 is connected in series with capacitor 21 and inductor 22 as described earlier. The junction of capacitor 21 and inductor 22 is connected to capacitor 26, the other terminal of which is connected to the anode of diode 27 and cathode of diode 28. The anode of diode 28 is connected to ground, and the cathode of diode 27 is connected to the parallel circuit of capacitor 29 and resistor 30 which is also connected to ground.

The cathode of diode 27 is also connected via capacitor 31 in series with resistors 32 and 33 to the non-inverting input of operational amplifier 34. The junction of capacitor 31 and resistor 32 is connected to the junction of resistors 35 and 36 which are connected between a source of potential +V and ground. The non-inverting input of operational amplifier 34 is connected through capacitor 38 to ground. The output of operational amplifier 34 is connected to its inverting input and through capacitor 37 to the junction of resistors 32 and 33.

The output of operational amplifier 34 is connected through capacitor 39 to the inverting input of operational amplifier 41 and to resistor 42 which is connected to ground. The output of operational amplifier 41 is connected through resistor 43 to its non-inverting input and to the junction of a voltage divider comprising resistors 44 and 45 which are connected in series between source of potential +V and ground.

The output of operational amplifier 41 is connected to the input of a buffer 46 which has its output connected to output terminal 25 through resistor 47.

In operation, oscillator 20 provides a signal at the resonant frequency of capacitor 21 and inductor 22. Preferably oscillator 20 can have its frequency manually adjusted to take care of capacitor and inductor tolerances, and to adjust the frequency at the factory to the resonant frequency. The resonant frequency is not critical, but should be a multiple of the highest count rate which is expected. One successful prototype utilized a resonant frequency of 100 KHz. Capacitor 21 can be 180 picofarads and inductor 22 about 12 millihenries.

The voltage to be detected across inductor 22 has been found in one prototype to be about 120 volts peak to peak. Clearly this is a very high voltage, given a power supply voltage +V of about 8 volts to ground, and oscillator 20 providing a logic level output signal.

The high voltage signal from inductor 22 is a.c. coupled through capacitor 26 to an envelope detector comprising diodes 27 and 28 and the glitch filter comprising capacitor 29 and resistor 30.

The signal is then applied through capacitor 31 to a high pass filter. Capacitor 31 and resistor 36 forms a high pass filter which limits the low frequency to, preferably, about 0.5 hertz.

The resulting signal is applied to an active low pass Butterworth filter comprising resistors 32 and 33, capacitors 37 and 38, and operational amplifier 34. In the aforenoted successful prototype, the active filter had a 12 db/octave rolloff above 200 hertz.

The resulting filtered signal is applied through coupling capacitor 39 to a level detector or comparator circuit, which has a substantial amount of hysteresis, to eliminate false triggering. The comparator establishes a threshold by the d.c. level obtained from the voltage divider made of resistors 44 and 45 as applied to the non-inverting input of operational amplifier 41. Filtered signals higher than the threshold level applied to the inverting input of operational amplifier 41 are passed, and applied to buffer 46. The resulting output signal from buffer 46 is at low impedance, and serves to drive the output line through resistor 47 at output terminal 25.

It is preferred to drive the output line at low impedance, in order that there should be minimum interference with the resulting pulses by ambient originated cross-talk and stray voltage spikes. The value of resistor 47 in the aforenoted prototype was 200 ohms.

For each passage of a pair of metallic vanes past the ferrite core, a pulse results at output terminal 25. The pulses can be counted by external circuitry (which does not form part of this invention), thus providing an indication of the flow rate. The prototype noted above was able to provide pulses at a rate of from 0.5 hertz (1/8 th rpm. of the impeller) to 400 Hertz (24,000 rpm.). Clearly this is a very wide flow rate range.

It should be understood that the circuit of this invention can also be used to detect rates of speed, etc. In this case, a metallic protrusion or bump can be applied to a wheel of a vehicle, or a wheel or disc associated with any other moving part. The ferrite core is brought into adjacency with the protrusion, and upon rotation of the wheel or disc, the present circuit provides an output pulse each time the protrusion passes the core. By utilizing circuitry for counting the number of pulses, the rotational rate of the wheel can be determined, and thus the vehicular speed.

It has also been found that the application of a special protrusion need not be made. As long as there is a natural protrusion or, indeed, a discontinuity in the plane of the wheel or disc, output pulses are produced and the rotational rate thereof can be determined.

Spokes in a wheel can also be sensed, the metallic discontinuities in a moving belt (which does not rotate), the rate of metallic material—carrying modules or larger items on a conveyor, etc.

The present invention is thus not only a flowmeter, but also a rotational rate or speed or quantity sensor. The described deficiences associated with a magnetic or reluctance sensor are substantially avoided, and as a flowmeter, it has been found to form an ideal means for detecting the flow rate of fluids which carry suspended particles including metallic particles, seeds, powders, etc. reliably and with consistent readings.

A person understanding this invention may now conceive of various alternative structures, modifications, or other embodiments. All are considered within the sphere and scope of this invention as defined in the claims appended hereto.

We claim:

1. Apparatus for detecting rates of motion comprising:
   (a) an inductor and a capacitor connected in a series circuit,
   (b) an oscillator connected in series with said circuit adapted to apply a signal to said circuit at a frequency at which the inductor and capacitor are in series resonance, (c) means for detecting the repetitive passage of a metallic element through the field of said inductor including:
  (i) means connected in parallel with said inductor for detecting the envelope of said signal, and
  (ii) means for converting pulsations in said envelope to an output signal designative of said passage repetition rate of said metallic element,
in which the frequency of said signal is a multiple of the highest expected repetition rate of passage of said element through said field.

2. Apparatus as defined in claim 1, in which the inductor is comprised of a coil of wire wound on a ferrite core, having at least one arm which is physically directed toward the path of said metallic element.

3. Apparatus as defined in claim 2 in which the ferrite core is comprised of a pair of arms which are both physically directed toward the path of said metallic element.

4. Apparatus as defined in claim 3, further including an impeller comprising a plurality of metallic vanes forming plural ones of said element symmetrically mounted along an axle, the axle lying parallel to a plane abutting the ends of said arms and perpendicular to a line joining the ends of said arms, adjacent the core, but spaced sufficiently from the core to allow free rotation of the impeller.

5. Apparatus as defined in claim 4, further including a pipe for carrying fluid material to be metered, the pipe having a hole in one side, the impeller being mounted with one vane extending into the pipe and the axle disposed perpendicular to the axis of the pipe at the side of the pipe, and means for sealing the hole around the apparatus outside of the pipe.

6. Apparatus as defined in claim 3, further including a wheel having at least one metallic protrusion thereon forming said element, means for mounting said core adjacent the protrusion whereby upon rotation of said wheel, the protrusion repetitively moves adjacent and past the ends of the arms of said core.

7. Apparatus as defined in claim 3, further including an impeller having metallic vanes forming plural ones of said element mounted for rotation with the passage of fluid material, said core being mounted adjacent the impeller whereby upon rotation of the impeller, it moves across the ends of the arms of said core.

8. A flowmeter comprising a T-shaped section of pipe, including a flow-through portion and a tapped portion, an impeller comprising a plurality of vanes mounted about an axle, each vane having an integral metallic component along its plane surface, the impeller being mounted with at least a portion of one vane extending into the flow-through portion, and the axle oriented perpendicular to the axis of the flow-through portion, means for sealing the tapped portion of the pipe around the impeller while allowing free rotation of the impeller about the axle within the pipe, an inductor wound around a portion of a U-shaped ferrite core, the inductor being located within the tapped portion of the pipe with the arms of the core directed toward the impeller, the axle being oriented parallel to a plane abutting the ends of the arms of the core and perpendicular to a line joining the ends of said arms, a capacitor connected in series with the inductor, and an oscillator connected to the capacitor and inductor for applying a signal thereto at a frequency whereby the inductor and capacitor are series resonance, means for detecting the envelope of said signal, and means for converting pulsations in said envelope caused by movement of the vanes in the field of the inductor to output pulses.

9. A flowmeter as defined in claim 8, in which the means for detecting includes diode detecting means A.C. coupled to the inductor and capacitor, and the means for converting is comprised of a bandpass filter A.C. coupled to the diode detecting means, a threshold detector for passing signals from the filter which exceed a predetermined threshold, and an output buffer for providing output signals at low line impedance.

10. Apparatus for detecting rates of motion comprising:
  (a) an inductor and a capacitor connected in a series circuit,
  (b) an oscillator connected to the series circuit adapted to apply a signal to said circuit at a frequency at which the inductor and capacitor are in series resonance,
  (c) means connected to said circuit for detecting the envelope of said signal,
  (d) means for converting pulsations in said envelope to an output signal designative of said passage repetition rate of said metallic element,
  (e) said inductor being comprised of a coil of wire wound on a ferrite core, having a pair of arms which are both physically directed toward the path of metallic element,
  (f) an impeller comprising a plurality of vanes forming plural ones of said element symetrically mounted along an axle, the axle lying parallel to a plane abutting the ends of said arms and perpendicular to a line joining the ends of said arms, adjacent the core, but spaced sufficiently from the core to allow free rotation of the impeller,
  (g) a pipe for carrying fluid material to be metered, the pipe having a hole in one side, the impeller being mounted with one vane extending into the pipe and the axle disposed perpendicular to the axis of the pipe at the side of the pipe, and means for sealing the hole around the apparatus outside of the pipe.

11. Apparatus as defined in claim 1, 3, 5 or 10 in which said means for converting is comprised of a bandpass filter for passing said detected envelope, a threshold detector connected to the output of said filter for passing the filtered envelope having amplitude above a predetermined minimum, and an output buffer connected to the threshold detector for providing said output signal.

12. Apparatus for detecting rates of motion comprising:
  (a) an inductor and a capacitor connected in a series circuit,
  (b) an oscillator connected in series with said circuit adapted to apply a signal to said circuit at a frequency at which the inductor and capacitor are in series resonance,
  (c) means for detecting the repetitive passage of a metallic element through the field of said inductor including:
    (i) means connected in parallel with one of said inductor and said capacitor for detecting the envelope of said signal, and
    (ii) means for converting pulsations in said envelope to an output signal designative of said passage repetition rate of said metallic element,
  in which the frequency of said signal is a multiple of the highest expected repetition rate of passage of said element through said field.

* * * * *